Dec. 2, 1952   L. H. HAWKES   2,620,408
HANGER FOR SUPPORTING ELECTRIC TROLLEY WIRES
Filed Oct. 11, 1948
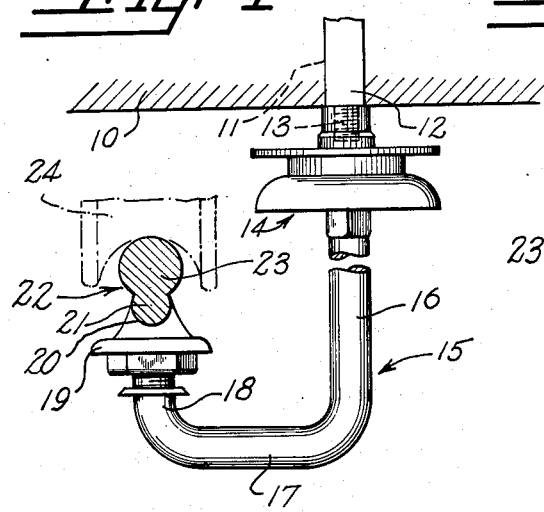
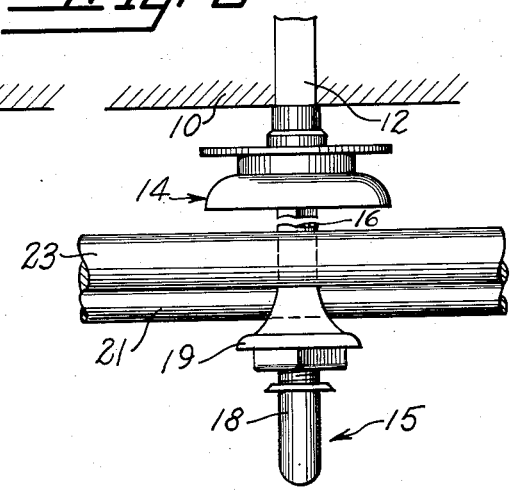
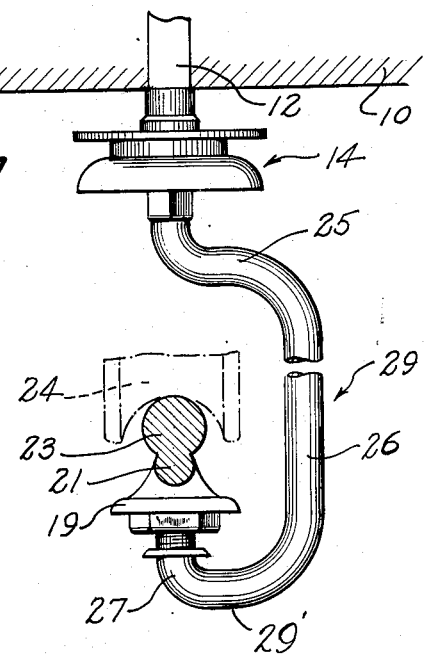
INVENTOR.
Lawrence H. Hawkes
ATTORNEYS Patented Dec. 2, 1952

2,620,408

UNITED STATES PATENT OFFICE 2,620,408

HANGER FOR SUPPORTING ELECTRIC TROLLEY WIRES

Lawrence H. Hawkes, Cannelton, W. Va., assignor of forty per cent to John W. Nitz, Cannelton, W. Va.

Application October 11, 1948, Serial No. 53,803

2 Claims. (Cl. 191—40)

This invention relates to a hanger for supporting overhead electric trolley wires as used in mines.

The object of the invention is to provide a hanger for supporting an overhead electric trolley wire so that a trolley slide can be moved therealong.

Another object of the invention is to provide a hanger which will support an overhead electric trolley wire in an upside-down position so that a trolley slide can be moved along the top thereof for electrically connecting the trolley wire to an electric trolley.

A further object of the invention is to provide an electric wire hanger which is extremely simple and inexpensive to manufacture.

Other objects and advantages will be apparent during the course of the following description.

In the accompanying drawings forming a part of this application, and in which like numerals are employed to designate like parts throughout the same:

Figure 1 is a side elevational view, illustrating the hanger supporting an overhead trolley wire;

Figure 2 is a front elevational view of the device of Figure 1;

Figure 3 is a side elevational view, illustrating a slightly modified hanger supporting an overhead trolley wire.

Referring in detail to Figures 1 and 2 of the drawings, the numeral 10 designates a portion of a ceiling beam as found in a coal mine and the like. The beam 10 is provided with a bore 11 which receives a plug 12, and a screw 13, Figure 1, connects the plug 12 to an insulated bell assembly 14.

Dependingly supported by the insulated bell assembly 14 is an L-shaped arm or shank 15 which is bent to define a vertically-disposed portion 16, and a horizontally-disposed portion 17 which terminates in an upturned, exteriorly-threaded end 18. Threaded on the end 18 of the arm 15 is a head 19 provided with an arcuate socket 20 in its top for receiving the small portion 21 of a trolley wire 22.

Normally, it is conventional to arrange the trolley wire 22 in a reverse direction, or in other words, the thick portion 23 of the trolley wire 22 would be arranged below the smaller portion 21, and a suitable trolley slide would be moved along the bottom of the thick portion 23 of the trolley wire 22 for conveying electrical energy from the wire to a trolley therebelow. However, this arrangement is unsatisfactory because the trolley slide frequently jumps off of the trolley wire and it requires considerable skill and effort on the part of the operator to move the trolley slide back into contact with the wire. By means of the hanger of the present invention, the overhead trolley wire 22 is supported in a reverse direction, and a trolley slide 24 (dotted lines, Figure 1), can be moved along so that the slide 24 is at all times in engagement with the top of the thick portion 23 of the trolley wire 22 so that an electrically-operated mine trolley, not shown, will be electrically connected to a source of electrical energy.

The hanger of Figures 1 and 2 is especially suitable for supporting overhead trolley wires in coal mines and the like, where there is a low ceiling. In Figure 3, there is illustrated a hanger which is especially suitable for mines having high ceilings. Thus, the hanger of Figure 3 has the same construction as the hanger of Figures 1 and 2, except that in Figure 3 the hanger arm or shank 29 is bent as at 25, to provide an elongated, laterally offset vertically-disposed portion 26, which is then bent to provide a horizontally disposed portion 29' which terminates in an upturned, externally-threaded end 27 serving the same purpose as the previously-described end 18 of the hanger of Figures 1 and 2.

As many embodiments may be made of this inventive concept, and as many modifications may be made in the embodiment hereinbefore shown and described, it is to be understood that all matter herein is to be interpreted merely as illustrative and not in a limiting sense.

I claim:

1. In a hanger for an electric trolley wire, the combination with a supporting plug carried by a mine ceiling and having a threaded stud projecting below the said mine ceiling, of an insulating bell threaded on said threaded stud of the plug, a shank carried by the insulating bell to depend therefrom and including a portion with its axis substantially vertically of the mine ceiling, a portion extending at substantially right-angles to the vertical portion and with its axis substantially parallel of the mine ceiling, and a vertically disposed externally threaded portion at the other end of the right-angle portion with its axis vertically disposed, and a head having an arcuate trolley wire holding seat in its upper surface threadedly received on the vertically disposed threaded portion of the shank for supporting the electric trolley wire between said shank externally threaded portion and ceiling.

2. In a hanger for an electric trolley wire, the combination with a supporting plug carried by a mine ceiling and a threaded stud on said plug depending below the mine ceiling, of an insulating bell threaded on said plug threaded stud, a shank carried by the insulating bell comprising a portion depending from the bell with its axis substantially vertically of the mine ceiling, a second portion substantially normal to the first portion, a third portion substantially normal to the second portion and with its axis substantially parallel with the axis of the first portion, a fourth portion substantially normal to the third portion and a vertically disposed portion at the free end of the fourth portion with its axis substantially vertical and in axial alignment with the axis of the first portion and exteriorly threaded, and a head threaded on the exteriorly threaded vertically disposed portion of the shank having an arcuate electric trolley wire holding socket in its upper surface for supporting an electric trolley wire between itself and the first portion of the shank.

LAWRENCE H. HAWKES.

REFERENCES CITED

The following references are of record in the file of this patent:

UNITED STATES PATENTS

| Number | Name | Date |
|---|---|---|
| 396,196 | Daft | Jan. 15, 1889 |
| 397,830 | Caughey | Feb. 12, 1889 |
| 825,299 | Bunn | July 10, 1906 |
| 946,135 | Von Kando | Jan. 11, 1910 |
| 1,048,656 | Christensen | Dec. 31, 1912 |
| 1,098,250 | Gonio | May 26, 1914 |
| 1,112,017 | Martin | Sept. 29, 1914 |
| 1,801,527 | Newell | Apr. 21, 1931 |

FOREIGN PATENTS

| Number | Country | Date |
|---|---|---|
| 3,747 of 1911 | Great Britain | June 8, 1911 |
| 4,397 of 1911 | Great Britain | Aug. 17, 1911 |